UNITED STATES PATENT OFFICE.

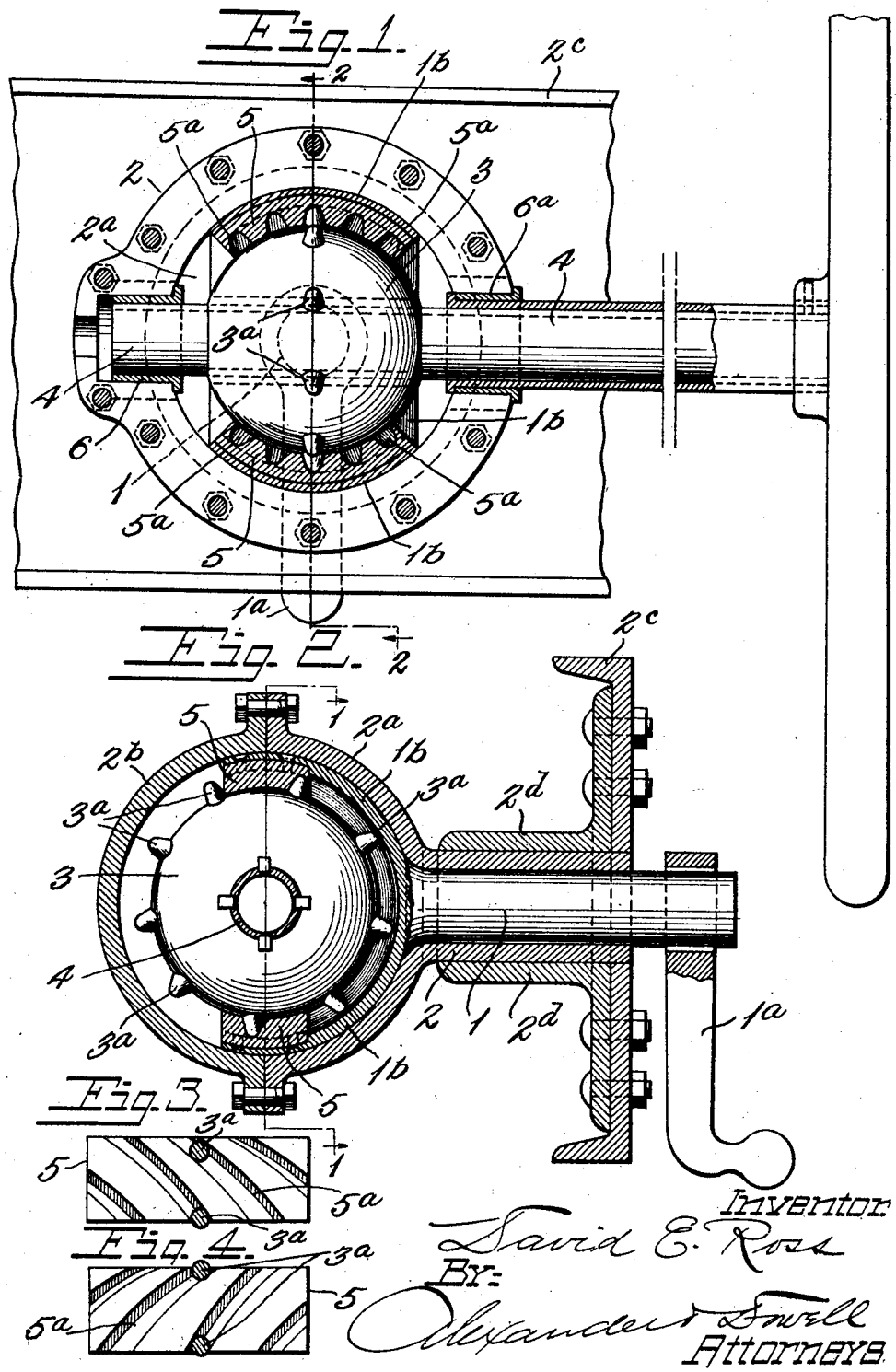

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

STEERING-GEAR.

1,393,974.   Specification of Letters Patent.   Patented Oct. 18, 1921.

Application filed March 7, 1921. Serial No. 450,463.

*To all whom it may concern:*

Be it known that I, DAVID E. ROSS, a citizen of the United States, residing at La Fayette, in the county of Tippecanoe and State of Indiana, have invented certain new and useful Improvements in Steering-Gears; and I hereby declare that the following is a full, clear, and exact description thereof, reference being had to the accompanying drawings, which form part of this specification.

This invention is an improvement in steering gears for automobiles, boats, etc. Its object is to provide a steering gear in which motion is transmitted direct from the steering shaft to the rocker shaft and which will hold the steering wheels or rudder securely in any desired adjusted position. A further object is to so construct the gear that the stresses of the transmission on the rocker shaft will be absorbed or counteracted in a part of the rocker shaft, thus preventing undue strains on the bearings of the rocker shaft.

The invention provides a very simple, compact gear in which back lash is prevented and heavy strains absorbed or counteracted. I will explain the invention with reference to the accompanying drawings which show one embodiment of the invention, and in the claims summarize the essentials of the invention and the novel features of construction and novel combinations of parts for which protection is desired.

In said drawings;

Figure 1 is a view of the steering gear with part of the casing removed, and partly in section on line 1—1, Fig. 2.

Fig. 2 is a transverse section, partly in elevation, on the line 2—2, Fig. 1.

Figs. 3 and 4 are detail views of the upper and lower toothed segments.

The rocker shaft 1 is shown as mounted in a bearing 2 forming part of a casing which may be fastened to the vehicle or mechanism with which the device is to be used by any suitable means, the casing being shown as mounted in a bracket $2^d$ attached to a beam $2^c$ of the chassis of a vehicle. The steering arm $1^a$ may be of any desired construction and connected in any suitable manner to the outer end of this rocker shaft. Preferably the steering arm is connected to the rocker shaft 1 as shown in my Patent #1,136,557, dated April 20, 1915.

On the inner end of the rocker shaft is a parti-spherical or semi-circular head $1^b$ which is adapted to partly surround a ball 3 which is preferably fitted closely and neatly within this head.

This ball 3 is keyed or otherwise rigidly fastened to the steering shaft 4 which extends at right angles to the rocker shaft 1 as shown, but may be set at any desired inclination to the vertical when the shaft 1 is horizontal.

This ball 3 is shown as provided with an equatorial circumferential series of projecting teeth $3^a$ which extend around the ball in a plane at right angles to the steering shaft 4. These teeth are adapted to engage spiral grooves in diametrically opposed segments 5 which are formed on or rigidly secured to diametrically opposite points of the head $1^b$ (see Figs. 1 and 2) so that the spiral grooves therein respectively engage with diametrically opposite teeth $3^a$ on the ball 3.

The segments 5 are provided with preferably spiral grooves $5^a$ which are so spaced that they will be successively engaged by the successive teeth $3^a$ on ball 3; and as the teeth $3^a$ rotate in a plane at right angles to the plane of the segments 5, the teeth $3^a$ will successively engage the grooves $5^a$ in the segments 5 as indicated.

Preferably I so space the teeth $3^a$ and so shape the grooves $5^a$ that as one tooth is leaving one groove $5^a$ another tooth $3^a$ will be etering the next groove $5^a$ (see Figs. 3 and 4) so that at no time will there be any disengagement between the teeth on the ball and the grooves in the segments.

The teeth $3^a$ engage the diametrically opposite segments 5 at diametrically opposite sides of the ball; and therefor the teeth at top and bottom of the ball move in opposite direction; but the segments 5 are so spirally grooved that both the upper and lower teeth $3^a$ coacting with the respective segments, will tend to rock or turn the head $1^b$ and the shaft 1 in the same direction; that is the teeth and segments at opposite sides of the ball do not oppose each other in action.

The steering shaft 4 may be journaled in suitable bearing in the casing. As shown this casing has a semi-spherical portion $2^a$ on the inner end of the bearing 2 to which is attached an opposed semi-spherical portion $2^b$, these portions may be provided with meeting flanges bolted together as indicated in Figs. 1 and 2 of the drawings. The portions 2ª—2ᵇ may also be provided with bearings of any suitable kind for the shaft 4ª, the bearings being only conventionally shown at 6 and 6ª in Fig. 1.

The steering shaft 4 may be tubular and when applied to an automobile the control rods can readily be passed through this shaft 4 and be connected to the usual operating devices on the steering wheel on the upper end of the shaft, and by the usual connections to the devices to be operated below the casing 2.

By referring to Figs. 1 and 2 it will be seen that when the steering shaft 4 is turned, say to the right, the ball 3 will be turned therewith and by reason of the action of the teeth 3ª and grooves 5ª in the segments 5 will rock shaft 1 say to the left. On the reverse rotation of the steering shaft the teeth and segments would rock shaft 1 to the right. The relative movements of the shafts 4 and 1 depend upon the spiral pitch of the spiral grooves 5ª in the segments 5. Any rotative movement of the shaft 4 will through the said devices cause a relative rocking movement of the shaft 1, the change of motion being effected immediately and directly by the engagement of the teeth 3ª with the spiral grooves 5ª in the segments. Any tendency of the operative engagement between the teeth and slots to bind the shaft 1 in its bearings, or twist it longitudinally in its bearings, is counteracted because the thrust of the teeth 3ª upon one segment 5ª is directly counteracted by the thrust of the diametrically opposed teeth 3ª upon the diametrically opposed segment 5; and therefore all the power exerted on the shaft 4 is utilized merely to rock the shaft 1 in its bearings without binding the same therein; so that with this construction there will be no cramping of the rocker shaft 1 in its bearings.

What I claim is:

1. In a steering gear; a rocker shaft member having diametrically opposed grooved segments on the inner end of said member; a toothed member having a circumferential series of teeth adapted to engage the grooves in the said opposed segments; and a steering shaft connected with said toothed member whereby rotatorial movement of the steering shaft imparts rocking movement to the rocker shaft member.

2. In a steering gear as set forth in claim 1; a casing supporting said rocker shaft and inclosing the segments and toothed member, substantially as described.

3. In a steering gear; a rocker shaft having diametrically opposed grooved segments on its inner end, a member entered between the segments and having a circumferential equatorial series of teeth adapted to engage the grooves in the opposed segments at opposite sides of the member, and a steering shaft connected to said member whereby rotatorial movement of the steering shaft imparts rocking movement to the rocker shaft.

4. In a steering gear as set forth in claim 3; a casing supporting said rocker shaft and inclosing the segments and toothed member and having bearings for the steering shaft, substantially as described.

5. In a steering gear, a rocker shaft having a hollow head; diametrically opposed grooved segments attached to said head; a member having a circumferential series of teeth adapted to engage the grooves in said opposed segments; and a steering shaft connected with said member whereby rotatorial movement of the steering shaft imparts rocking movement to the rocker shaft.

6. In a steering gear as set forth in claim 5; a casing supporting said rocker shaft and inclosing the segments and toothed member and having bearings for the steering shaft, substantially as described.

7. In a steering gear, a rocker shaft having a hollow head at its inner end; diametrically opposed grooved segments in said head; a ball shaped member entered in said head between the segments and having an equatorial series of teeth adapted to engage the grooves in the opposed segments and a steering shaft extending into said head and attached to said member, whereby rotatorial movement of the steering shaft imparts rocking movement to the rocker shaft.

8. In a steering gear as set forth in claim 7; a casing supporting said rocker shaft and inclosing the head and toothed member and having bearings for the steering shaft, substantially as described.

9. In a steering gear, a rocker shaft having a parti-spherical head on its inner end, and diametrically opposed spirally grooved segments attached to and within said head; a ball shaped member fitted within the head and having an equatorial series of teeth adapted to engage the spiral grooves in the opposed segments in the head at opposite sides of the ball, and a steering shaft extending through said head and ball and rigidly connected with said ball, whereby rotatorial movement of the steering shaft imparts rocking movement to the rocker shaft.

10. In a steering gear as set forth in claim 9; a casing supporting said rocker shaft and having a split globular head surrounding and inclosing the parti-spherical head and ball, and having bearings above and below the head for the steering shaft, substantially as described.

In testimony that I claim the foregoing as my own, I affix my signature.

DAVID E. ROSS.